(12) United States Patent
Horng et al.

(10) Patent No.: US 7,019,423 B1
(45) Date of Patent: Mar. 28, 2006

(54) BRUSHLESS DC MOTOR WITH TRAY COUPLING STRUCTURE

(75) Inventors: Alex Horng, Kaohsiung (TW); Arthur Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/053,895

(22) Filed: Feb. 10, 2005

(51) Int. Cl.
*H02K 5/24* (2006.01)

(52) U.S. Cl. .................. 310/51; 310/67 R; 360/99.12; 360/98.08

(58) Field of Classification Search ............... 310/51, 310/67 R, 90, 261; 360/99.04, 99.05, 99.12, 360/98.07, 98.08
See application file for complete search history.

(56) References Cited

U.S. PATENT DOCUMENTS

| | | | | |
|---|---|---|---|---|
| 5,142,176 A | * | 8/1992 | Takahashi | 310/90.5 |
| 5,446,610 A | * | 8/1995 | Elsaesser et al. | 360/99.08 |
| 5,621,588 A | * | 4/1997 | Williams et al. | 360/98.07 |
| 5,739,602 A | * | 4/1998 | Suzuki et al. | 310/51 |
| 6,256,289 B1 | * | 7/2001 | Miyamoto | 369/266 |
| 6,330,126 B1 | * | 12/2001 | Ishizaki et al. | 360/99.08 |
| 6,525,441 B1 | * | 2/2003 | Yamaguchi | 310/90 |
| 6,580,186 B1 | * | 6/2003 | Suzuki et al. | 310/51 |
| 6,700,241 B1 | | 3/2004 | Horng et al. | 310/67 R |
| 6,815,852 B1 | | 11/2004 | Horng et al. | 310/67 R |

FOREIGN PATENT DOCUMENTS

| | | |
|---|---|---|
| TW | 456667 | 9/2001 |
| TW | 590329 | 6/2004 |
| TW | 222777 | 10/2004 |

* cited by examiner

*Primary Examiner*—Dang Le
(74) *Attorney, Agent, or Firm*—Bacon & Thomas, PLLC

(57) ABSTRACT

A brushless DC motor includes a fixed portion and a rotor. The rotor includes a shaft and a top engaging face. The shaft is rotatably held by the fixed portion. The top engaging face is located on a top side of the rotor. The rotor further includes at least one protruded engaging portion on the top engaging face. A carrier such as a tray or the like is fixedly coupled with the at least one protruded engaging portion. A compartment is defined in the rotor by the at least one protruded engaging portion. A filling material may be filled into the compartment for adjusting rotational balance of the rotor.

17 Claims, 4 Drawing Sheets

BRUSHLESS DC MOTOR WITH TRAY COUPLING STRUCTURE

BACKGROUND OF THE INVENTION

1. Field of the Invention

The present invention relates to a brushless DC motor. In particular, the present invention relates to a brushless DC motor with a tray coupling structure.

2. Description of Related Art

FIG. 1 illustrates a conventional brushless DC motor for an optical disc that is disclosed in, e.g., Taiwan Utility Model Publication Nos. 456667 and 590329, and U.S. Pat. No. 6,815,852. Such a brushless DC motor comprises a fixed base 11, a bearing 12, a stator 13, a rotor 14, and a tray 15. The fixed base 11 includes a control circuit and an axial tube 111 in a central portion thereof for receiving the bearing 12 and for supporting the stator 13. The stator 13 is controlled by the control circuit on the fixed base 11 and creates an alternating magnetic field. The rotor 14 includes a shaft 141 rotatably held by the bearing 12 and an annular magnet 142 for induction with the alternating magnetic field to drive the rotor 14 to turn. The tray 15 is coupled to an end of the shaft 141 and driven by the rotor 14. The tray 15 includes a clamping seat 151 for clamping an optical disc.

After mounting the tray 15 onto the shaft 141, the tray 15 is often oblique relative to the shaft 141. To avoid rotational balance of the optical disc and to reduce the disqualified product rate, the bottom face of the tray 15 is grinded to eliminate obliquity of the tray 15. However, the grinding procedure takes a long time, and repetitious tests are required during the grinding procedure. Further, excessive grinding adversely affects the strength and rotational stability of the tray 15.

Taiwan Patent Publication No. 222777 and U.S. Pat. No. 6,700,241 disclose a brushless motor comprising a rotor with a protruded engaging portion in a center of the rotor for engaging with a clamping seat. Thus, an optical disc can be directly loaded on a top face of the rotor. However, adjustment in rotational balance is impossible. In other words, in a case that the rotor is oblique relative to the fixed tube, the axial tube, and the stator, rotational balance could not be obtained. Further, as miniaturization is a trend of spindle motors, it would be impossible for the top face of the rotor having a relatively small area to bear an optical disc.

OBJECTS OF THE INVENTION

An object of the present invention is to provide a brushless DC motor with a tray coupling structure that provides assembling convenience, flexible adjustment in rotational balance, and reliable loading of an optical disc.

Another object of the present invention is to provide a brushless DC motor with a tray coupling structure that allows mounting of a weight member for achieving rotational balance.

SUMMARY OF THE INVENTION

A brushless DC motor in accordance with the present invention comprises a fixed portion and a rotor. The rotor comprises a shaft and a top engaging face. The shaft is rotatably held by the fixed portion. The top engaging face is located on a top side of the rotor.

The rotor further includes at least one protruded engaging portion on the top engaging face. A carrier such as a tray or the like is fixedly coupled with the at least one protruded engaging portion. A compartment is defined in the rotor by the at least one protruded engaging portion. The compartment is used to adjust rotational balance of the rotor relative to the fixed portion.

A filling material may be filled into the compartment for adjusting rotational balance of the rotor.

In an embodiment of the invention, the at least one protruded engaging portion is formed on a peripheral portion of the top engaging face and defines a central engaging space for coupling with the carrier. Preferably, the at least one protruded engaging portion is annular.

In another embodiment of the invention, the at least one protruded engaging portion is formed on a central portion of the top engaging face and in contact with a axial seat of the rotor to which an end of the shaft is fixed. Preferably, the at least one protruded engaging portion is annular and defines a peripheral engaging space for coupling with the carrier. Preferably, the at least one protruded engaging portion is integrally formed with the axial seat of the rotor.

In another embodiment of the invention, the at least one protruded engaging portion is located between a peripheral portion of the top engaging face and a central portion of the top engaging face. Preferably, the at least one protruded engaging portion is annular and defines an inner engaging space and an outer engaging space for coupling with the carrier.

In a further embodiment of the invention, the at least one protruded engaging portion includes a peripheral annular protruded engaging portion located on a peripheral portion of the top engaging face and a central annular protruded engaging portion formed on a central portion of the top engaging face and in contact with a axial seat of the rotor to which an end of the shaft is fixed. The peripheral annular protruded engaging portion and the central annular protruded engaging portion together define an annular engaging space for coupling with the carrier. Preferably, the central annular protruded engaging portion is integrally formed with the axial seat of the rotor.

The at least one protruded engaging portion may include a plurality of holes, and a plurality of screws are extended through the carrier into the holes for adjusting the rotational balance of the rotor.

Preferably, the carrier is a tray including an engaging seat and at least one clamping member on the engaging seat. The tray includes at least one engaging portion on an underside thereof. The at least one engaging portion of the tray is complementary to the at least one protruded engaging portion. Preferably, the at least one engaging portion of the tray is engaged with the top engaging face and the at least one protruded engaging portion by one of fitting engagement and glue.

Preferably, the fixed portion further includes a base, an axial tube fixed on the base, a bearing received in the axial tube for rotatably holding the shaft, a stator mounted to the axial tube, and a circuit board. Preferably, the bearing is an oily bearing, a ball bearing, a liquid bearing, or a magnetic bearing.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
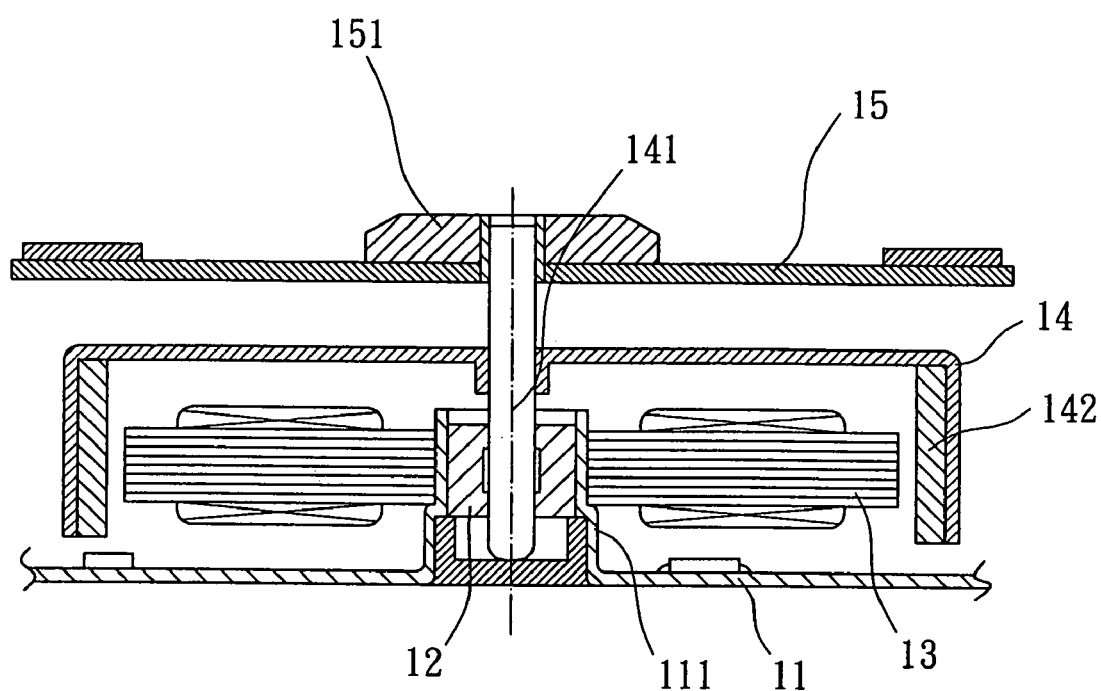
FIG. 1 is a sectional view of a conventional brushless motor.
Figure 2:
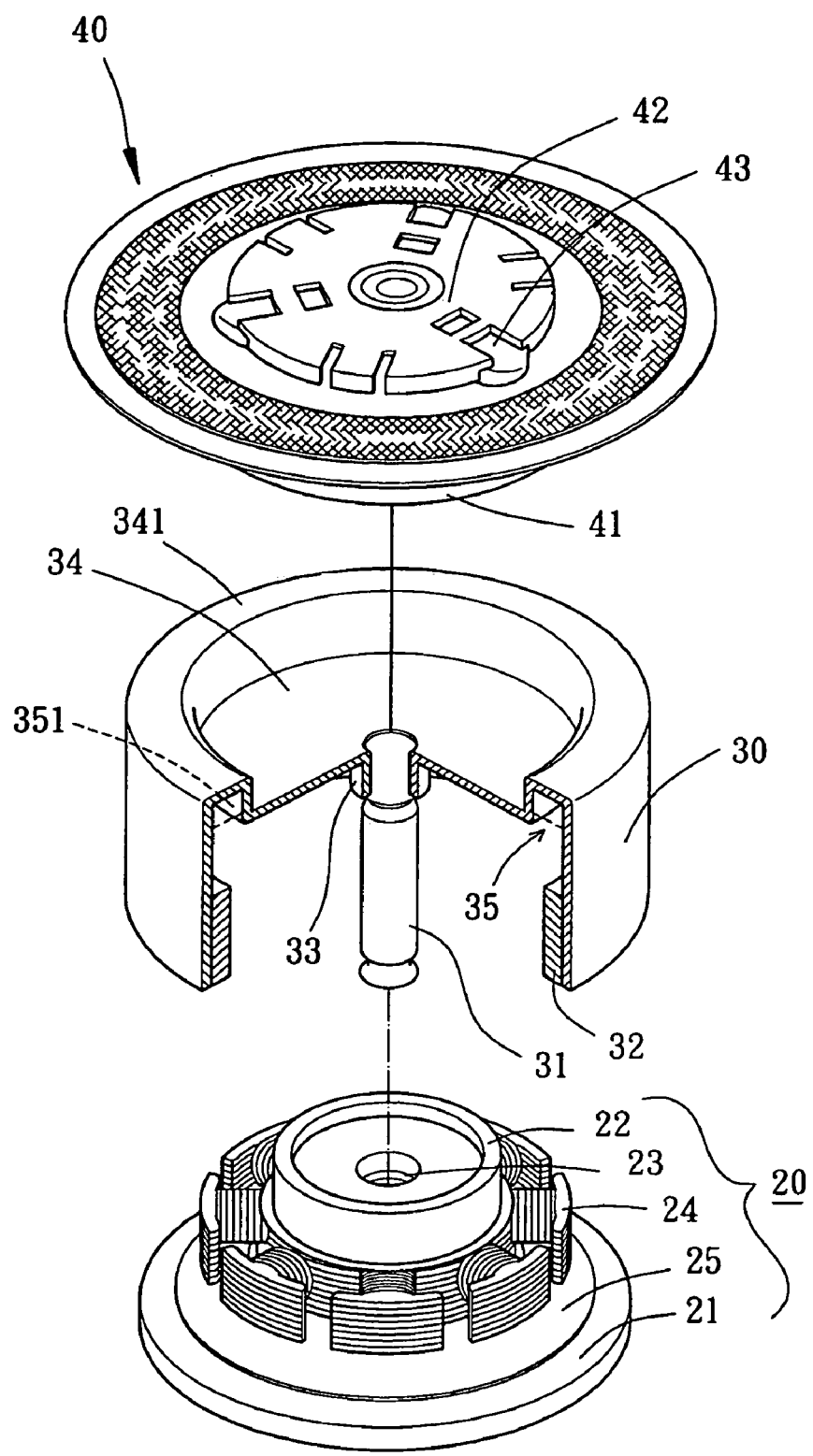
FIG. 2 is an exploded perspective view of a first embodiment of a brushless DC motor in accordance with the present invention.
Figure 3:
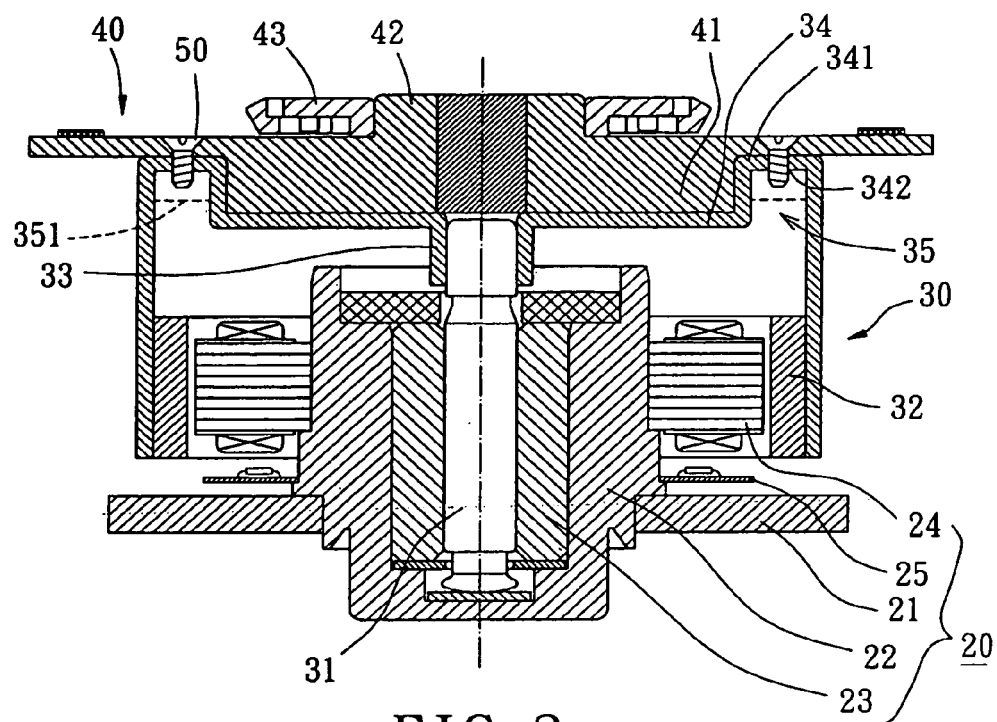
FIG. 3 is a sectional view of the first embodiment of the brushless DC motor in accordance with the present invention.

Referring to FIGS. 2 and 3, a first embodiment of a brushless DC motor in accordance with the present invention comprises a fixed portion 20, a rotor 30, and a tray 40. The fixed portion 20 includes a base 21, an axial tube 22, a bearing 23, a stator 24, and a circuit board 25. The base 21 can be fixed in a casing of an optical disc drive (not shown). The axial tube 22 is fixed on or integrally formed with the base 21. At least one bearing 23 (one in this embodiment) is mounted in the axial tube 22. The stator 24 and the circuit board 25 are mounted around the axial tube 22. The bearing 23 may be an oily bearing, a ball bearing, a fluid dynamic bearing, or a magnetic bearing. The stator 24 may include radial winding or axial winding. The circuit board 25 includes a control circuit. The circuit board 25 may be integrally formed with the base 21. When the control circuit of the circuit board 25 is powered, the stator 24 is controlled to create an alternating magnetic field.

Still referring to FIGS. 2 and 3, the rotor 30 includes a shaft 31, an annular magnet 32, a axial seat 33, and a top engaging face 34. The axial seat 33 is formed on a central portion of an inner face of the rotor 30. An end of the shaft 31 is securely mounted to the axial seat 33, and the other end of the shaft 31 is rotatably extended through the bearing 23. The annular magnet 32 is mounted to an inner periphery of the rotor 30 and surrounds the stator 24. Thus, the alternating magnetic field created by the stator 24 drives the rotor 30 to and the shaft 31 to turn.

The top engaging face 34 is the outer face of the rotor 30 and includes at least one protruded engaging portion 341. In the illustrated embodiment, an annular protruded engaging portion 341 is formed along a peripheral portion of the top engaging face 34, forming a central engaging space (not labeled). The annular protruded engaging portion 341 may include a plurality of holes 342, and screws 50 are extended through holes (not labeled) in a tray 40 and the holes 342, thereby fixing the tray 40 to the top engaging face 34. The holes 342 and the screws 50 may also be used as weight members to adjust the rotational balance of the rotor 30. A compartment 35 is defined in the rotor 40 by the annular protruded engaging portion 341. A filling material 351, in an alternative embodiment indicated in FIGS. 2 and 3 by dashed lines, may be filled into the space 35 and act as a weight member for adjusting the rotational balance of the rotor 30 relative to the fixed portion 20.

Still referring to FIGS. 2 and 3, the tray 40 is substantially a disc and includes an engaging portion 41 having a shape complementary to that of the top engaging face 34. In the illustrated embodiment, the engaging portion 41 protrudes from an underside of the tray 40 and is received in the central engaging space of the top engaging face 34. Thus, the engaging portion 41 can be fixedly engaged with at least one face of the annular protruded engaging portion 341 and the top engaging face 34 by fitting engagement or glue. The tray 40 further includes an engaging seat 42 on a top face thereof. The tray 40 further includes at least one clamping member 43 mounted to the engaging seat 42 for resiliently clamping an optical disc or the like.

Referring to FIG. 3, in assembly, the tray 40 is mounted to the rotor 30. The engaging portion 41 of the tray 40 is fixed to the top engaging face 34 and the annular protruded engaging portion 341 by fitting engagement or glue. If necessary, the tray 40 is coupled to the rotor 30 by the provision of holes 342 and screws 50 to improve the assembling strength. Next, the shaft 31 of the rotor 30 is extended through the bearing 23 of the fixed portion 20. After initial assembly, rotational balance of the rotor 30 and the tray 40 is tested. In a case that the rotor 30 and the tray 40 are oblique relative to the fixed portion 20 or rotational imbalance is found, an appropriate filling material 351 acting as a weight member is filled into the compartment 35. Alternatively, holes 342 and screws 50 are provided at appropriate locations of the annular protruded engaging portion 341. Thus, the weight member of the rotor 30 can be adjusted until the rotor 30 and the tray 40 achieve desired rotational balance relative to the fixed portion 20.

As illustrated in FIG. 3, the annular protruded engaging portion 341 can be used to couple a carrier, such as a tray 40 or the like. Further, the annular protruded engaging portion 341 provides a compartment 35 allowing rapid adjustment in the rotational balance of the rotor 30 and the tray 40. The assembling convenience, assembling flexibility, and loading reliability are improved.

Figure 4:
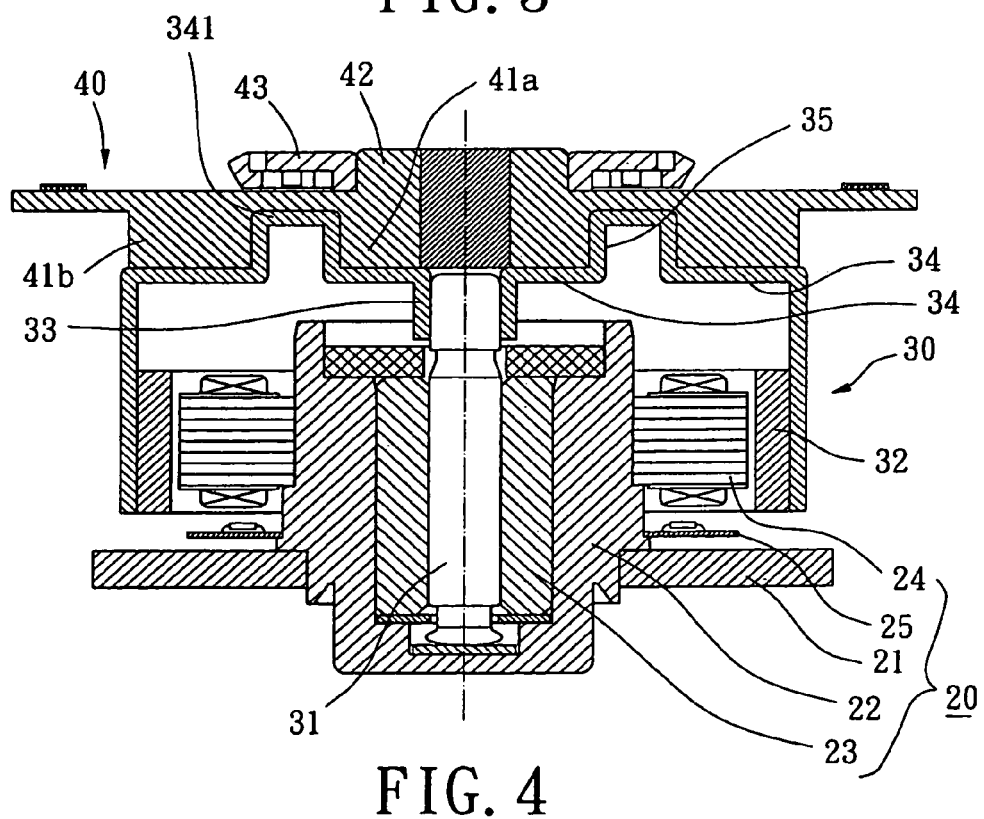
FIG. 4 is a sectional view illustrating a second embodiment of brushless DC motor in accordance with the present invention.

FIG. 4 shows a second embodiment of the invention, wherein the annular protruded engaging portion 341 is located between a central portion and the peripheral portion of the top engaging face 34, defining an inner engaging space (not labeled) and an outer engaging space (not labeled). The tray 40 includes an inner engaging portion 41a complementary to and received in the inner engaging space and an outer engaging portion 41b complementary to and received in the outer engaging space. The inner engaging portion 41a and the outer engaging portion 41b are respectively engaged with an inner periphery and an outer periphery of the annular protruded engaging portion 341 and in contact with the top engaging face 34. Again, a compartment 35 is defined by the annular protruded engaging portion 341 for receiving filling material acting as a weight member for adjusting rotational balance of the rotor 30 and the tray 40. The holes 342 and screw 50 in the first embodiment can be used in this embodiment for fixing the tray 40 and/or adjusting the rotational balance.

Figure 5:
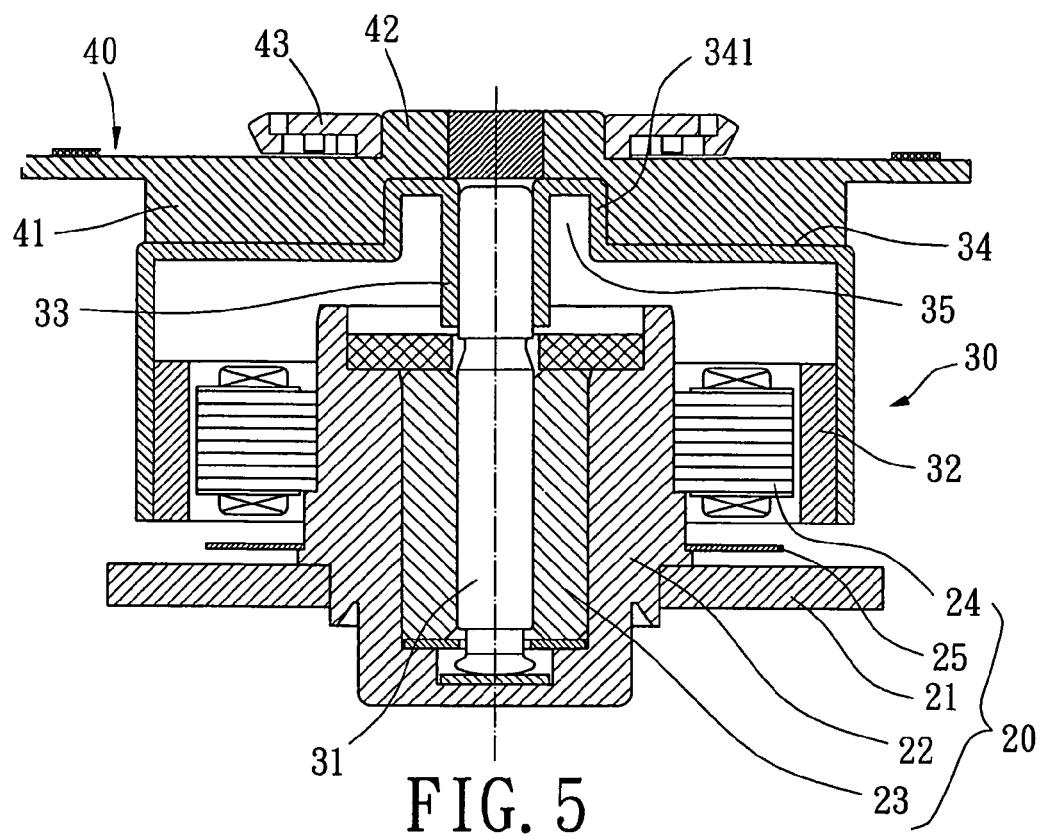
FIG. 5 is a sectional view illustrating a third embodiment of brushless DC motor in accordance with the present invention.

FIG. 5 shows a third embodiment of the invention, wherein the annular protruded engaging portion 341 is located on the central portion of the top engaging face 34 and in contact with the axial seat 33. A peripheral engaging space (not labeled) is defined around the annular protruded engaging portion 341 for coupling with an engaging portion 41 of the tray 40. Preferably, the annular protruded engaging portion 341 is integrally formed with the axial seat 33. The complementary engaging portion 41 of the tray 40 is engaged with an outer periphery of the annular protruded engaging portion 341 by fitting engagement or glue and that is in contact with the top engaging face 34. A compartment 35 is defined by the annular protruded engaging portion 341. A filling material (not labeled) acting as a weight member can be filled into the compartment 35 for adjusting rotational balance of the rotor 30 and the tray 40. The holes 342 and screw 50 in the first embodiment can be used in this embodiment for fixing the tray 40 and/or adjusting the rotational balance.

Figure 6:
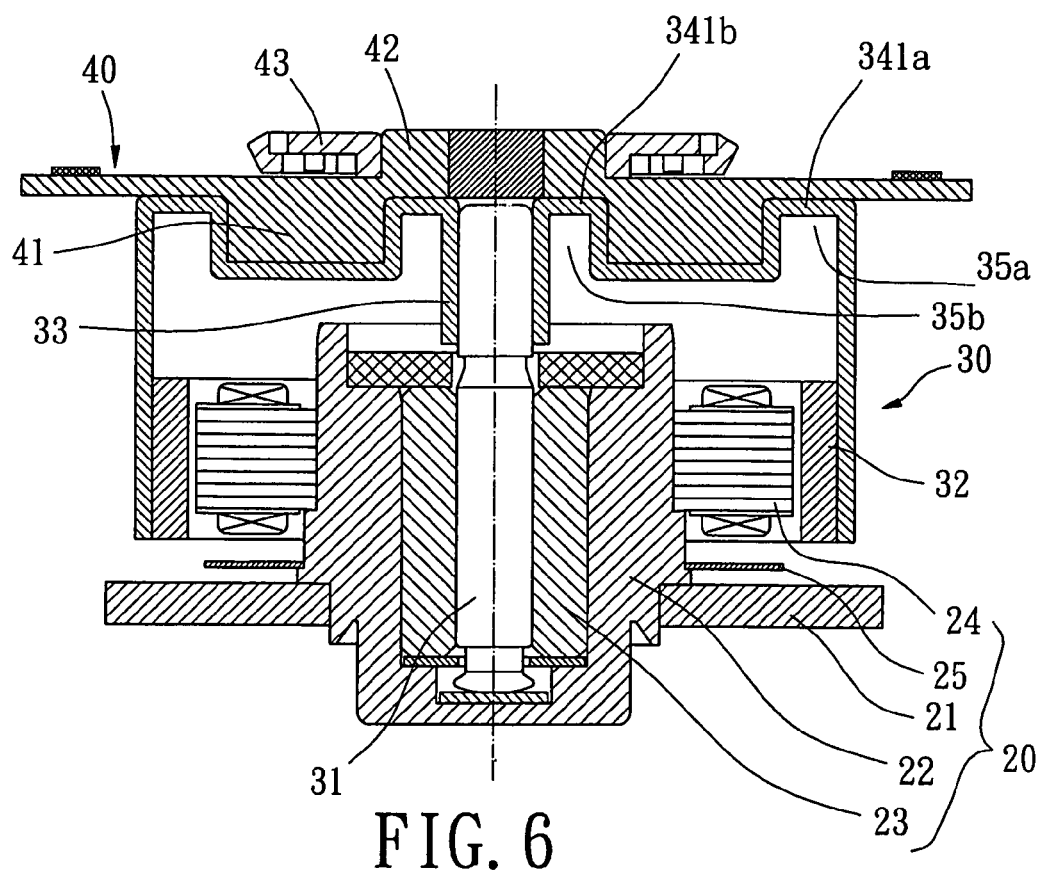
FIG. 6 is a sectional view illustrating a fourth embodiment of brushless DC motor in accordance with the present invention.

FIG. 6 shows a fourth embodiment of the invention, wherein the top engaging face 34 includes a central annular protruded engaging portion 341b located on the central portion of the top engaging face 34 and in contact with the axial seat 33. The top engaging face 34 further includes a peripheral annular protruded engaging portion 341a located along a peripheral portion of the top engaging face 34. Preferably, the central annular protruded engaging portion 341a is integrally formed with the axial seat 33. The peripheral annular protruded engaging portion 341a and the central annular protruded engaging portion 341b together define an annular engaging space (not labeled) for coupling with the tray 40.

The tray 40 includes a complementary engaging portion 41 that is engaged with an outer periphery of the central annular protruded engaging portion 341b and an inner periphery of the peripheral annular protruded engaging portion 341a by fitting engagement or glue and that is in contact with the top engaging face 34. A compartment 35b is defined by the central annular protruded engaging portion 341b, and a compartment 35a is defined by the peripheral annular protruded engaging portion 341a. Filling materials (not labeled) acting as weight members can be filled into the compartments 35a and 35b for adjusting rotational balance of the rotor 30 and the tray 40. The holes 342 and screw 50 in the first embodiment can be used in the central and peripheral annular protruded engaging portions 341a and 341b in this embodiment for fixing the tray 40 and/or adjusting the rotational balance.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A brushless DC motor comprising:
   a fixed portion; and
   a rotor comprising a shaft and a top engaging face, the shaft being rotatably held by the fixed portion, the top engaging face being located on a top side of the rotor;
   the rotor further including at least one protruded engaging portion on the top engaging face, said at least one protruded engaging portion being adapted to fixedly couple with a disc carrier constructed from a tray including at least one engaging portion on an underside thereof, said engaging portion of the tray being received in said at least one protruded engaging portion of the rotor when assembled;
   a compartment being defined in the rotor by said at least one protruded engaging portion such that said compartment surrounds said engaging portion of the tray, the compartment being used to adjust rotational balance of the rotor relative to the fixed portion.

2. The brushless DC motor as claimed in claim 1, further comprising a filling material filled into the compartment for adjusting rotational balance of the rotor.

3. The brushless DC motor as claimed in claim 1, wherein said at least one protruded engaging portion is formed on a peripheral portion of the top engaging face.

4. The brushless DC motor as claimed in claim 3, wherein said at least one protruded engaging portion is annular and defines a central engaging space for coupling with the carrier.

5. The brushless DC motor as claimed in claim 1, wherein said at least one protruded engaging portion is formed on a central portion of the top engaging face and in contact with an axial seat of the rotor to which an end of the shaft is fixed.

6. The brushless DC motor as claimed in claim 5, wherein said a t least one protruded engaging portion is annular and defines a peripheral engaging space for coupling with the carrier.

7. The brushless DC motor as claimed in claim 6, wherein said at least one protruded engaging portion is integrally formed with the axial seat of the rotor.

8. The brushless DC motor as claimed in claim 1, wherein said at least one protruded engaging portion is located between a peripheral portion of the top engaging face and a central portion of the top engaging face.

9. The brushless DC motor as claimed in claim 8, wherein said at least one protruded engaging portion is annular and defines an inner engaging space and an outer engaging space for coupling with the carrier.

10. The brushless DC motor as claimed in claim 1, wherein said at least one protruded engaging portion includes a plurality of holes, a plurality of screws being extended through the carrier into the holes for adjusting the rotational balance of the rotor.

11. The brushless DC motor as claimed in claim 1, wherein the carrier is a includes an engaging seat and at least one clamping member on the engaging seat.

12. The brushless DC motor as claimed in claims 1, wherein said at least one engaging portion of the tray is engaged with the top engaging face and said at least one protruded engaging portion by one of fitting engagement and glue.

13. The brushless DC motor as claimed in claims 1, wherein the fixed portion further includes a base, an axial tube fixed on the base, a bearing received in the axial tube for rotatably holding the shaft, a stator mounted to the axial tube, and a circuit board.

14. The brushless DC motor as claimed in claim 13, wherein the bearing is one of an oily bearing, a ball bearing, a liquid bearing, and a magnetic bearing.

15. The brushless DC motor as claimed in claim 1, wherein said at least one protruded engaging portion includes a peripheral annular protruded engaging portion located on a peripheral portion of the top engaging face and a central annular protruded engaging portion formed on a central portion of the top engaging face and in contact with an axial seat of the rotor to which an end of the shaft is fixed.

16. The brushless DC motor as claimed in claim 15, wherein the peripheral annular protruded engaging portion and the central annular protruded engaging portion together define an annular engaging space for coupling with the carrier.

17. The brushless DC motor as claimed in claim 16, wherein the central annular protruded engaging portion is integrally formed with the axial seat of the rotor.

* * * * *